US009250884B2

(12) United States Patent
Ravi (10) Patent No.: US 9,250,884 B2
(45) Date of Patent: Feb. 2, 2016

(54) AUTOMATIC DEPLOYMENT OF SOFTWARE APPLICATIONS TO MEET REGULATORY COMPLIANCE REQUIREMENTS

(75) Inventor: Kiran Vedula Venkata Naga Ravi, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 255 days.

(21) Appl. No.: 13/551,449

(22) Filed: Jul. 17, 2012

(65) Prior Publication Data

US 2014/0026131 A1 Jan. 23, 2014

(51) Int. Cl.
*G06F 9/445* (2006.01)

(52) U.S. Cl.
CPC .............. *G06F 8/60* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 8,234,641 B2 * | 7/2012 | Fitzgerald et al. ................ | 718/1 |
| 8,386,533 B2 | 2/2013 | Venkata Naga Ravi | |
| 8,528,099 B2 | 9/2013 | Venkata Naga Ravi | |
| 8,631,458 B1 * | 1/2014 | Banerjee .......................... | 726/1 |
| 2009/0249439 A1 * | 10/2009 | Olden et al. ...................... | 726/1 |
| 2009/0249440 A1 * | 10/2009 | Platt et al. ......................... | 726/1 |
| 2010/0071066 A1 * | 3/2010 | Kline et al. ..................... | 726/25 |
| 2010/0175106 A1 * | 7/2010 | Diebler et al. ..................... | 726/1 |
| 2010/0275263 A1 * | 10/2010 | Bennett et al. .................. | 726/25 |
| 2012/0136904 A1 | 5/2012 | Venkata Naga Ravi | |
| 2012/0198559 A1 | 8/2012 | Venkata Naga Ravi | |
| 2012/0222004 A1 * | 8/2012 | Labat et al. .................... | 717/120 |
| 2012/0296914 A1 | 11/2012 | Romanov et al. | |
| 2012/0311523 A1 * | 12/2012 | Venkataraman et al. ..... | 717/104 |
| 2013/0073892 A1 * | 3/2013 | Whitlock et al. .............. | 714/4.1 |
| 2013/0247136 A1 * | 9/2013 | Chieu et al. ....................... | 726/1 |
| 2013/0262643 A1 * | 10/2013 | Anderson et al. ............. | 709/223 |
| 2014/0068053 A1 | 3/2014 | Ravi et al. | |

* cited by examiner

*Primary Examiner* — Don Wong
*Assistant Examiner* — Roberto E Luna
(74) *Attorney, Agent, or Firm* — Vista IP Law Group, LLP (57) ABSTRACT

A method, system, and computer program product for cloud-based deployments of software applications that are monitored for compliance with regulatory requirements. One exemplary method commences upon receiving an indication of a compliance corpus such as HIPPA or SOX, then mapping the compliance corpus to one or more predetermined configurations of a virtual compliance platform. Any of the particular predetermined configurations include steps, operations, and/or rules for provisioning infrastructure (e.g., using cloud-resident resources). After provisioning the virtual compliance platform based on the predetermined configuration, the provisioning operations further deploys a compliance monitor. The compliance monitor encapsulates the software application within the compliance monitor so as to monitor and/or log the operation and performance of the software application with respect to the compliance regulations. In some cases, a virtual compliance platform includes a virtual machine.

21 Claims, 10 Drawing Sheets

AUTOMATIC DEPLOYMENT OF SOFTWARE APPLICATIONS TO MEET REGULATORY COMPLIANCE REQUIREMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of cloud-based deployments of software applications and more particularly to techniques for automatic deployment of software applications to meet with regulatory compliance requirements.

BACKGROUND

Various service markets have the need for deploying business applications that meet the regulatory requirements imposed by applicable government and regulatory authorities. Examples of such regulatory requirements include HIPPA (vis-à-vis healthcare) and SOX (vis-à-vis financial transactions), to name just a couple.

Large organizations involved in businesses subject to regulatory requirements often have departments dedicated to ensuring regulatory compliance. Such departments may perform or participate in audits, as well as update compliance policies and procedures to meet changing regulatory requirements. However, smaller organizations often do not have the resources to dedicate to ensuring regulatory compliance. Still more, recent and expected legislation has expanded regulatory requirements and liability to include even very small entities. For example, even an individual physician with a small practice or even a small-town pharmacy must comply with applicable regulations. The technical challenges of complying with regulatory requirements is increasing day-by-day. As well, so is the extent of government scrutiny to ensure compliance.

Although most of the above-identified entities subject to regulatory compliance cannot cost-effectively dedicate the same resources as that of a large corporate organization, most of these entities nevertheless offer some form of online services that may be subject to such regulations. For example, a physician or pharmacist might offer a web site presence for the convenience of their customers (patients, healthcare providers, etc.), and the web site might facilitate "secure chat" with a physician, or perhaps online registration for tests, and/or viewing of lab reports, etc., and such activities may be subject to many regulations (e.g., HIPPA). In another domain, organizations (even small, single-proprietor organization) that facilitate financial transactions may offer a web site presence for the convenience of their customers (traders, investors, etc.), and related activities may be subject to extensive regulations (e.g., SOX).

Merely requiring such smaller organizations to comply does not address the problems in achieving such compliance. Indeed, there are several barriers facing smaller organizations in developing compliant applications (e.g., web-based applications). More specifically:

The web-based application may not be designed and implemented to achieve 100% compliance in a way to support a showing of compliance in a court of law.

The application or hosting infrastructure may not meet journaling standards needed for compliance.

The application or hosting infrastructure may not implement the necessary security policies to manage or prevent security breaches, loss of data, or other malicious attacks.

Ad hoc or legacy techniques are deficient, and yet, still more barriers are presented to these organizations in that as new regulations are enacted, and/or as existing regulations are changed, the impact to compliance must be analyzed, further exacerbating the problem.

Some or all of the aforementioned deficiencies in the legacy approaches can be addressed using an automated approach involving techniques to perform automatic deployment of software applications to meet regulatory compliance requirements.

SUMMARY

The present disclosure provides an improved method, system, and computer program product suited to address the aforementioned issues with legacy approaches. More specifically, the present disclosure provides a detailed description of techniques used in methods, systems, and computer program products for automatic deployment of software applications to meet regulatory compliance requirements.

Herein disclosed are a method, system, and computer program product for cloud-based deployments of software applications that are monitored for compliance with regulatory requirements. One exemplary method commences upon receiving a customer/client indication of a need to operate in compliance with a particular corpus of regulations such as HIPPA or SOX. Such a requirement and implied requirements based on the corpus of regulations (e.g., a compliance corpus) is mapped to one or more predetermined configurations of a virtual compliance platform. Any of the particular predetermined configurations include steps, operations, and/or rules for provisioning infrastructure (e.g., using cloud-resident resources). After provisioning the virtual compliance platform based on the predetermined configuration, the provisioning operations further deploys a compliance monitor. The compliance monitor encapsulates the software application within the compliance monitor so as to monitor and/or log the operation and performance of the software application with respect to the compliance regulations.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing automatic deployment of software applications to meet regulatory compliance requirements. More particularly, disclosed herein are environments, methods, and systems for implementing automatic deployment of software applications to meet regulatory compliance requirements.

Overview

Using the techniques as disclosed herein, a cloud service provider such as Oracle or Amazon can provide a compliance platform (e.g., compliance monitoring facilities and infrastructure), which compliance platform is configured in accordance with the specific applicable regulations, and can offer the foregoing as a service offering. In an exemplary case, customers of this service offering typically develop their own applications (e.g., web-based applications) and follow simple configuration and uploading procedures in order to deploy the aforementioned web-based application into the cloud service provider's compliance platform. The web-based application might be merely one component of an entire system or subsystem, and, in particular, the system or subsystem can comprise networking facilities and user interfaces. An appropriately-configured compliance platform can include storage and communication monitoring facilities as well as networking infrastructure, and the platform can be automatically provisioned in order to meet or exceed the demands of compliance, at least to the extent that the configured compliance platform addresses particular regulatory impacts on the system or subsystem.

Figure 1A:
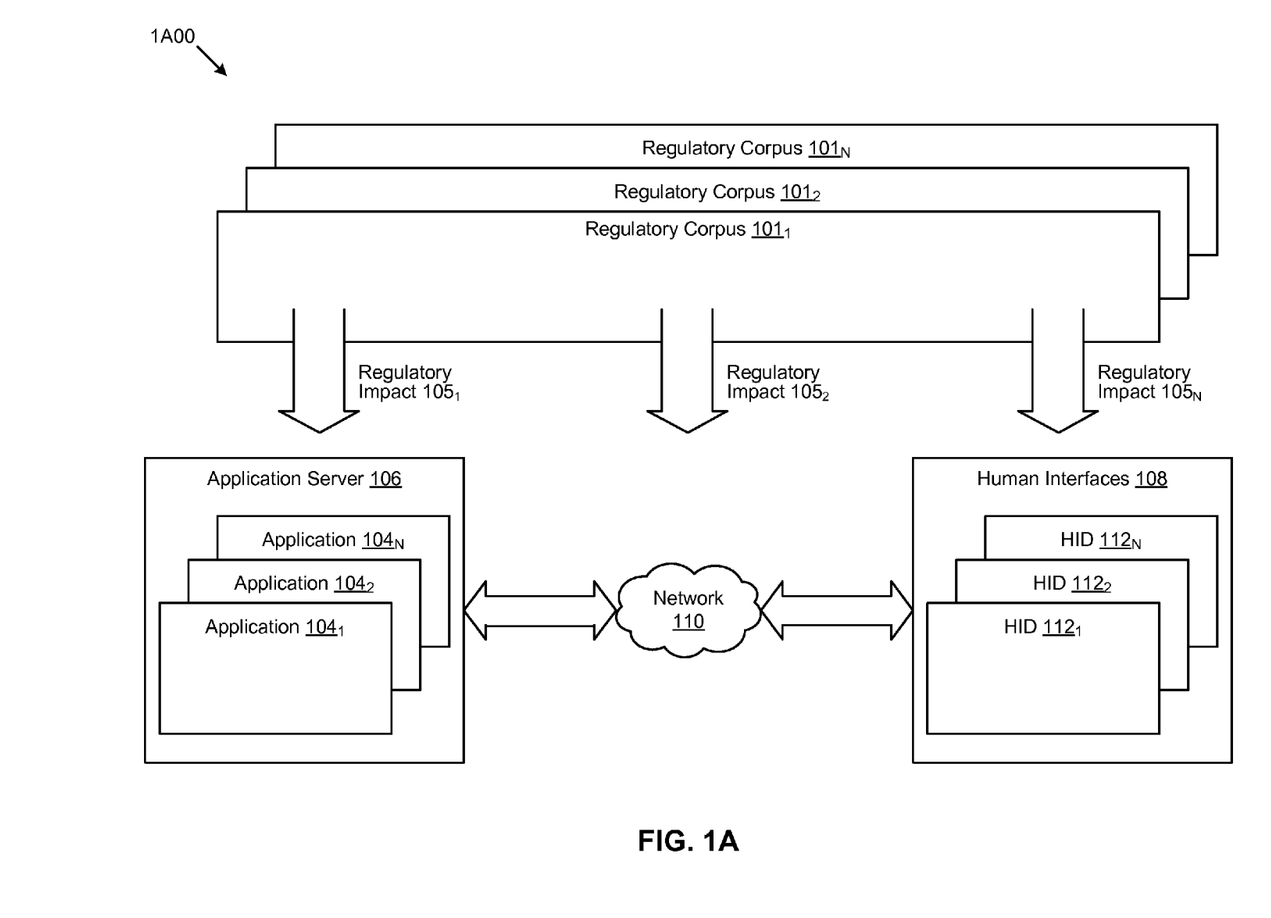
FIG. 1A exemplifies regulatory compliance impacts on components of a subsystem exemplifying the need for automatic deployment of software applications to meet regulatory compliance requirements.

FIG. 1A exemplifies regulatory compliance impact on components of a subsystem in a regulatory environment 1A00, showing the need for automatic deployment of software applications to meet regulatory compliance requirements. As an option, any aspect of the present regulatory environment 1A00 may be implemented in the context of the architecture and functionality of the embodiments described herein.

The regulatory environment 1A00 as shown includes one or more regulatory corpora, portions of which comprise a rules for compliance (e.g., regulatory corpus $101_1$, regulatory corpus $101_2$, regulatory corpus $101_N$, etc.), and any one or more constituents of the regulatory corpora may comprise any one or more forms of compliance requirements (e.g., a portion of a bill or law, a code, a Federal Regulation, etc., collectively a "compliance corpus" or "compliance corpora") that impact the software and/or hardware of the subsystem. For example, and as shown, the regulatory corpus $101_1$ impinges a regulatory impact (e.g., regulatory impact $105_1$, regulatory impact $105_2$, regulatory impact $105_N$, etc.) on the application server 106, and also on the applications (e.g., application $104_1$, application $104_2$, application $104_N$, etc.) running within the application server. The application server can comprise a single physical server, or can comprise multiple physical servers, or can be implemented in the form of one or more virtual servers (e.g., a virtual machine or "VM"). And, the applications running within the application server can include applications that are wholly subject to regulatory compliance, or partially related to regulatory compliance, or even not subject to regulatory compliance.

For example, consider a healthcare provider (say a physician) providing online services for patient registration, for completing a health screening questionnaire online, and/or for messaging with the physician over a messaging protocol (e.g., email, chat, etc.). And consider that the physician has arranged to have built a custom application tailored to his/her practice, and supports activities within the doctor's office including integration with the physician's billing and payment systems. In such a case, the physician's operations may be subject to regulatory compliance under "The Health Insurance Portability and Accountability Act of 1996" (HIPPA), as well as under the "Credit Card Accountability Responsibility and Disclosure Act of 2009" (referring to PCI). Moreover, the regulatory impacts may impinge on the application server 106, the applications running within the application server, the network 110 and or communications through the network 110, and possibly on the human interfaces 108, etc. The impact may come in the form of a requirement or prescription for using a particular protocol, or in the form of a requirement or compliance prescription for using a particular technology, or any other form of a compliance prescription.

Figure 1B:
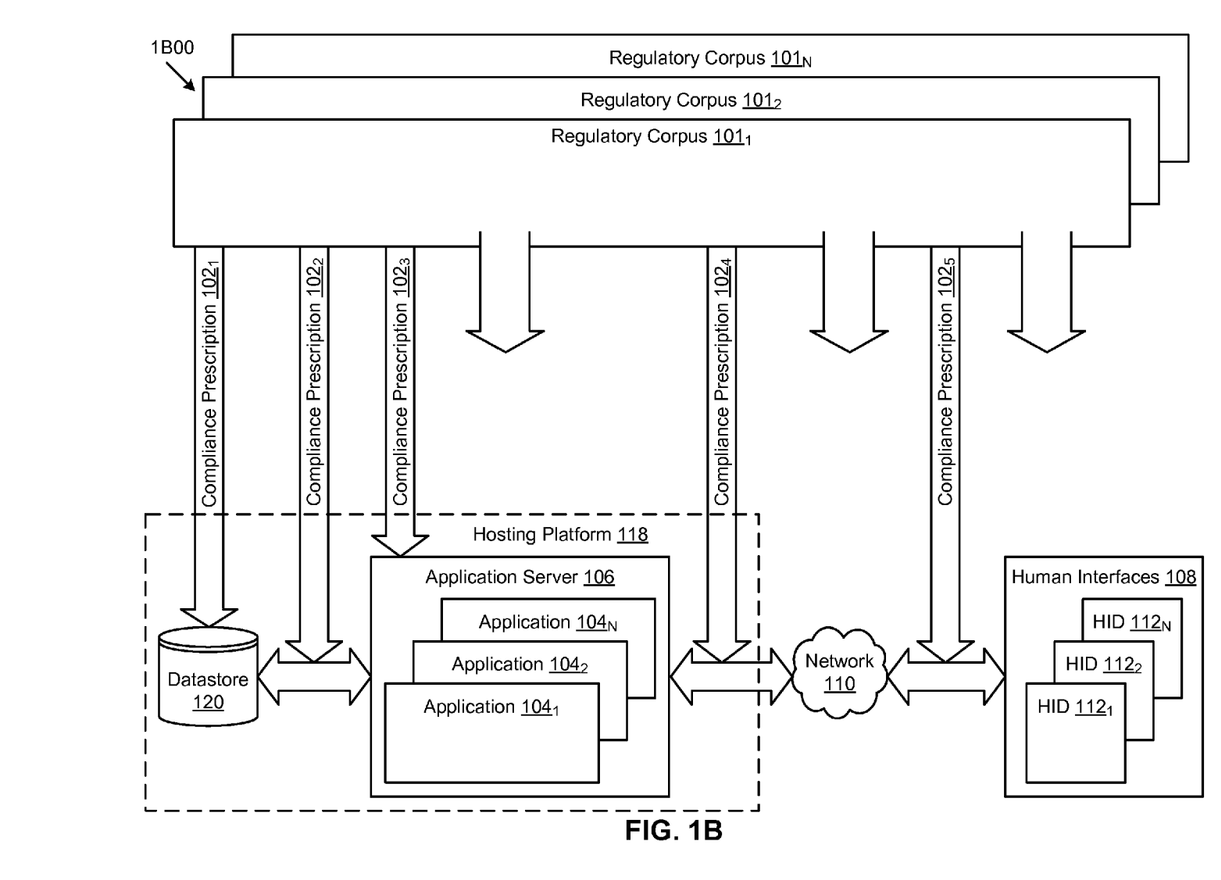
FIG. 1B exemplifies deployment of compliance prescriptions on components of a subsystem exemplifying the need for automatic deployment of software applications to meet regulatory compliance requirements, according to some embodiments.

FIG. 1B exemplifies deployment of compliance prescriptions on components of a subsystem 1B00 exemplifying the need for automatic deployment of software applications to meet regulatory compliance requirements. As an option, the present subsystem 1B00 may be implemented in the context of the architecture and functionality of the embodiments described herein. Also, the subsystem 1B00 or any aspect therein may be implemented in any desired environment.

As shown, a particular compliance impact may come in the form of a rule or requirement and/or a prescription (e.g., compliance prescription $102_1$, compliance prescription $102_2$, compliance prescription $102_3$, compliance prescription $102_4$, compliance prescription $102_5$, etc.). For example, the rules or requirements and/or prescriptions may impact one or more components of the hosting platform 118. In the example shown, the compliance prescription $102_1$ refers to requirements for storage (see FIG. 2 for more such prescriptions), and the compliance prescription $102_2$ refers to the private nature of communications between application server 106 and a datastore 120. Similar such rules (e.g., compliance prescription $102_3$, compliance prescription $102_4$, compliance prescription $102_5$, etc.) apply to other features of the subsystem to be regulated. As aforementioned, such regulations, rules, requirements, prescriptions, technologies, etc. can be onerous and relatively expensive for the organization to comply with, thus techniques to ease the burden are needed. One such technique is to deploy the software application to a managed cloud infrastructure, possibly including deployment of all or part of the hosting platform.

Descriptions of Exemplary Embodiments

Figure 1C:
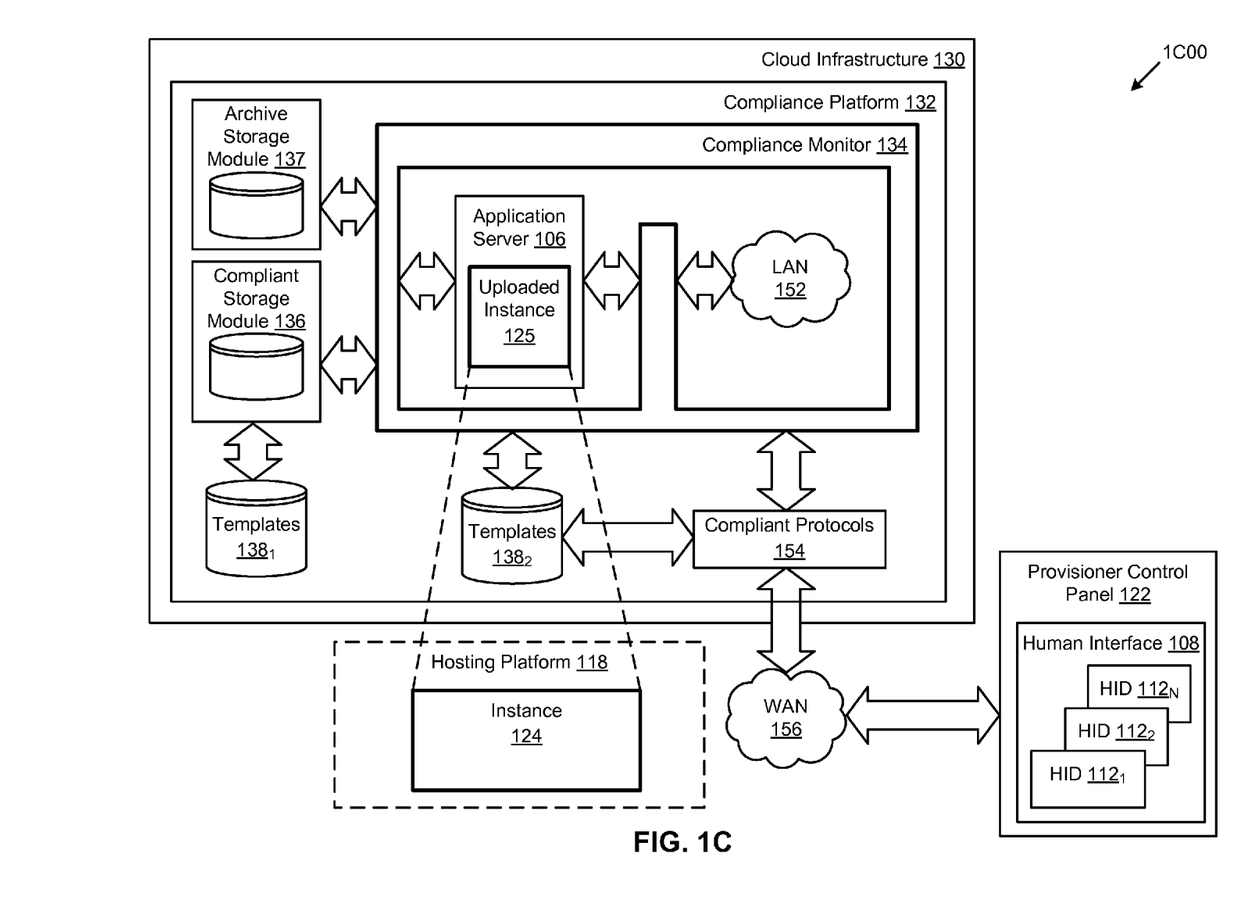
FIG. 1C shows an environment for automatic deployment of software applications to meet regulatory compliance requirements, according to some embodiments.

FIG. 1C shows an environment 1C00 for automatic deployment of software applications to meet regulatory compliance requirements. As an option, the present environment 1C00 may be implemented in the context of the architecture and functionality of the embodiments described herein. Also, the environment 1C00 or any aspect therein may be implemented in any desired environment.

Continuing the example of a physician operating a small private practice, a specific configuration of compliance prescriptions can be implemented in conjunction with the physician's applications. Such configurations can be deployed on behalf of the physician when the physician merely requests (for example) a "HIPPA compliant infrastructure". Such a deployment can be offered for deployment by the cloud infrastructure provider (or agent) under a purchase agreement or lease agreement or subscription agreement. The physician (or agent) may interact with a human interface 108 to configure the provisioning of the cloud infrastructure and other aspects pertaining to the purchase agreement or lease agreement or subscription agreement. In some cases the human interface 108 can comprise one or more HID modules (e.g., HID $112_1$, HID $112_2$, HID $112_N$, etc.), and a collection of HID modules can comprise a provisioner control panel 122.

Continuing this example, the physician (or agent) may indicate the desire to subscribe to "HIPPA compliance", and may then be given some choices for configuring a cloud-based infrastructure. Strictly as examples, the offering for "HIPPA compliance" can include options as follows:

Data Storage Options:
  Oracle Database Version 11gR2 PS (Patchset) 4 running on RedHat Enterprise Linux, x86 64 bit, kernel 2.4.9-e3
Application Server VM Options:
  Apache Web Server V2.4 running on Win2k-64-bit with mod_php, mod_proxy
  Weblogic 11gR2 Web Server running on RedHat Enterprise Linux x86, 64-bit, kernel 2.4.9-e3 with SSO and JDK1.6.

More generally, customers of the cloud infrastructure can choose options from a menu (e.g., a menu within a provisioner control panel 122) in order to select one or more platforms (e.g., a specific configuration of cloud infrastructure components) as may be needed to deploy their application. Returning to the example of the physician, suppose that the physician's applications were hosted on a hosting platform running Apache on Linux; that is, that the physician's applications were hosted on a Linux-based implementation of the hosting platform 118. In such a case, the physician could select the "Apache" menu option. The physician (or agent) would prepare an instance of the application and/or application environment (as depicted, see instance 124) and would use the provisioner control panel 122 for uploading the instance of the application to the cloud infrastructure 130 for running within a compliance monitor 134.

Further, given the expressed desire for "HIPPA compliance" (or any other supported regulatory compliance configuration) a provisioning application can prepare a compliance platform 132. Such a compliance platform has attributes that can include (for example) a compliant storage module 136, an archive storage module 137, and/or compliant protocols 154. The characteristics of the compliant storage module 136, archive storage module 137, and/or compliant protocols 154 can be taken from configuration templates (e.g., templates $138_1$, templates $138_2$, etc.). Such configuration templates can also comprise configurations, and/or parameters, and or code segments that are used to configure a compliance monitor 134.

In this manner, the target infrastructure deployments are custom hardened for the desired compliance. As a specific example, a datastore 120 might be set up within a compliant storage module 136, which compliant storage module 136 serves to ensure secure file storage (i.e., data cannot be read by using hard disk tools). Or a configuration template might specify that stored data is to be encrypted using 128-bit encryption, or that the datastore operates using Net8/SSL.

Such a configuration is implemented in components other than the software application (e.g., implemented in components other than the instance 124), thus the design and setup of the customer's application(s) can be agnostic to the specific regulatory compliance prescriptions. Strictly as another example, the aforementioned Apache application server virtual machine (VM) can be set up with an auto lockout of IP after some specific number of failed login attempts. Or, a specific configuration of fraud detection software can be deployed.

As can be seen from the disclosure herein, in the event that there are changes to the regulations that impact any compliance requirements, an appropriate prescription can be defined and provided in a provisioning menu, and/or can be automatically applied to the infrastructure in a manner that is transparent to the user.

Some regulations (e.g., SOX) require compliance with specific archiving procedures. In such a case, and following the advances of the disclosure herein, an archive storage module 137 can be automatically configured so as to support the specific archive mode or modes enabled in order to track transactions in accordance with the regulations. The foregoing examples pertain to the mentioned United States regulations; however, the configurations may vary significantly when a different regulation is applied, or when a particular compliance platform is deployed with respect to a foreign sovereign power.

Continuing with additional capabilities of the herein-disclosed systems, the underlying infrastructure for communication networks can be set up to be configured for authentication, encryption and network transport logging, and/or to use specific protocols as may be required by a prescription. The templates $138_2$ can be used to specify and configure compliant protocols 154, and any selected/configured instances of compliant protocols can be implemented in a LAN 152 and or the WAN 156, or both, or elsewhere for that matter.

Still further, in some cases, served application pages (e.g., web pages) can be automatically imposed with digital rights management (DRM) facilities so as to prevent fraudulent access. Such automatically imposed DRM can be accomplished in a manner that is transparent to the application.

As shown, the compliance platform comprises a compliance monitor 134, which in turn comprises an uploaded instance 125 (e.g., an uploaded instance of an application 104, or an uploaded instance of an application server 106, etc.). The configuration to the cloud infrastructure to form a compliance platform (e.g., a virtual platform) is configured using configuration templates. The configuration templates can be managed, modified, and reused and/or upgraded by the cloud vendor to ensure that the cloud application customers are up-to-date with regulatory compliance even as the prescriptions for regulatory compliance may be changed over time.

The foregoing aspects of deploying a compliance-agnostic application into a compliance platform, and encapsulating the compliance-agnostic application within a compliance monitor, serves to facilitate cloud vendors that desire to provide competitive services to specific market segments—even in the presence of stringent regulatory requirements. Additional regulated specific market segments encompass healthcare providers, pharmacies, energy providers, law practitioners, and professionals in various finance industries, to name a few.

Additional Descriptions of Exemplary Embodiments

Figure 2:
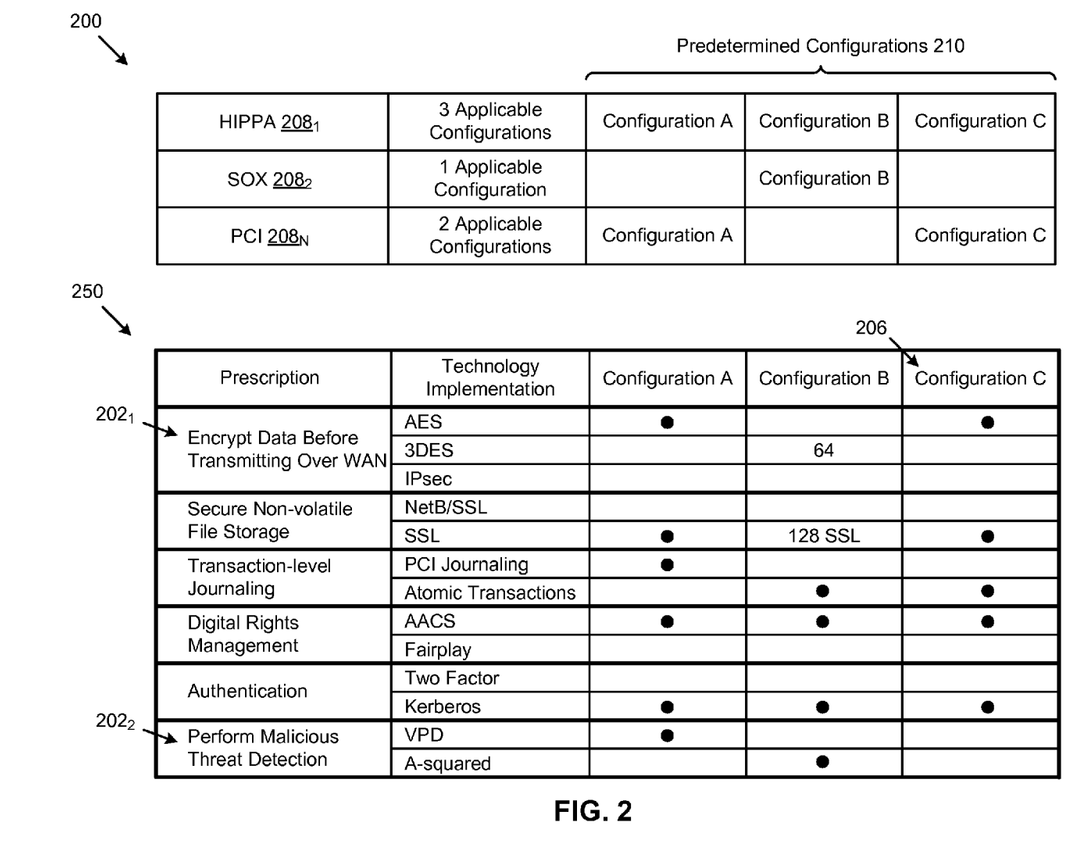
FIG. 2 is a configuration data structure for automatic deployment of software applications to meet regulatory compliance requirements, according to some embodiments.

FIG. 2 is a configuration data structure 200 for automatic deployment of software applications to meet regulatory compliance requirements. As an option, the present configuration data structure 200 may be implemented in the context of the architecture and functionality of the embodiments described herein. Also, the configuration data structure 200 or any aspect therein may be implemented in any desired environment.

As shown, the configuration data structure includes matrix 250 including a column labeled "Prescription", which can correspond to the compliance prescriptions of FIG. 1B. For example, to be compliant to a regulation may entail following a rule such as "protect client data against electronic eavesdropping", and a prescription might involve techniques to "encrypt data before transmitting over WAN" (see prescription entry $202_1$). Or, to be compliant to a regulation may entail a following a rule such as "take measures to protect client data against malware", and a prescription might involve techniques to "perform malicious threat detection" (see prescription entry $202_2$).

Now, given a set of prescriptions and a set of technology implementations, specific configurations can be defined such that a configuration comprises one or more technology implementations. Of course, a particular configuration might be directed to specific regulatory corpora, and might (or might not) encompass a given prescription or technology. For example, and as shown, the exemplary Configuration C 206 is applicable to situations where the regulatory compliance does not require malicious threat detection. Accordingly, the Configuration C does not include any indication of a technology implementation of malicious threat detection.

The configuration data structure 200 can be used to map the name of a compliance corpus, possibly in the form of a regulatory corpus indication (e.g., HIPPA regulatory corpus indication $208_1$, SOX regulatory corpus indication $208_2$, PCI regulatory corpus indication $208_N$, etc.) to one or more suitable predetermined configurations 210. Such a mapping is shown in configuration data structure 200.

Figure 3:
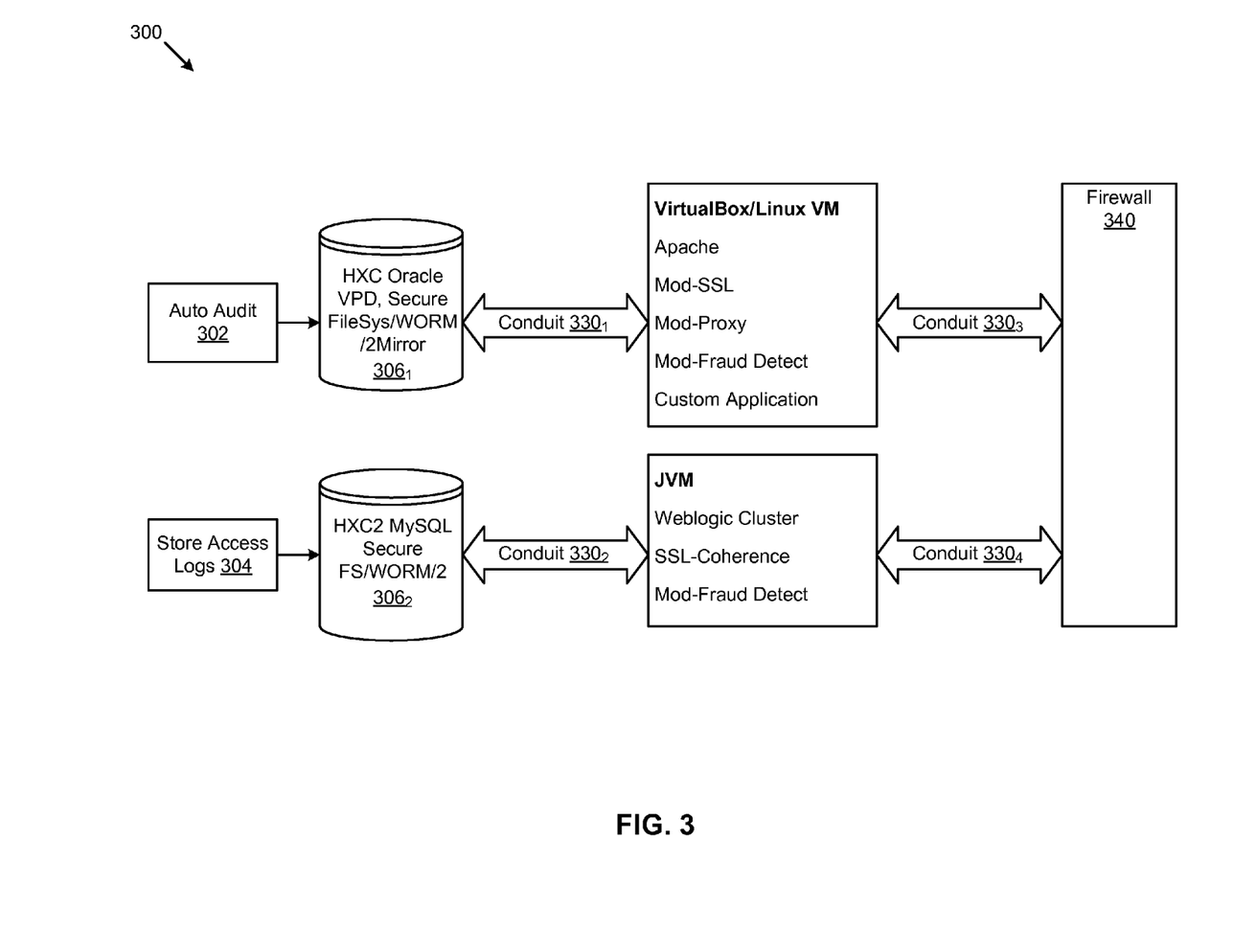
FIG. 3 shows exemplary selections of technology implementations used in automatic deployment of software applications to meet regulatory compliance requirements, according to some embodiments.

FIG. 3 shows exemplary selections 300 of technology implementations used in automatic deployment of software applications to meet regulatory compliance requirements. As an option, the present selections 300 may be implemented in the context of the architecture and functionality of the embodiments described herein. Also, the selections 300 or any aspect therein may be implemented in any desired environment.

The selections depicted embody but one group of possible configurations to satisfy a particular set of compliance rules. As shown, the option to auto audit 302 is enabled, as is the option to store access logs 304. Additional exemplary possibilities are given below. As for the storage architecture, as shown there are two different volumes depicted, each one with different storage configurations (see storage configuration $306_1$ and storage configuration $306_2$). The data retrieved from (or bound for) the respective storage repository is carried by respective storage-centric instances of conduit (see conduit $330_1$, conduit $330_2$), which conduit can be configured. For example, a conduit might comprise a fibre channel network, or might be iSCSI, or might implement some other transport.

Also depicted are applications running within selected VMs, labeled "VirtualBox" and "JVM". Various components (including configurable components) can run under the VMs, and the VMs can use networking-centric instances of conduit (see conduit $330_3$, conduit $330_4$) to communicate to/from a network such as a packet switching network (e.g., see LAN 152). A configured firewall 340 can be specified (e.g., in a configuration template).

Additional exemplary components are given in the following listing.
Transaction Journaling/Auto Audit
   Access Logs, Apache log mining
   Full Audit history
   Automatic Digital Rights Management for Content Served by the application
      Example: Prevent cached images/html pages from being viewed by other users
   Fraud detection and Alerting
   Failed Login lockout of user accounts
   Network intrusion detection and prevention
Storage
   HXC Oracle VPD, Secure FileSys/WORM/2 Mirror
   HXC2 MySQL Secure FS/WORM/2
   Transparent Encryption enabled storage with secure erasure
Application VM
   Apache under Linux
   Weblogic Cluster
   Coherence
Encryption/Firewall
   Apache
   Mod-SSL
   Mod-Proxy
   Network Intrusion Detection Systems
   MAC address/IP based host identification
   Client certificate based authentication The above selections can be used as components in a configuration template corresponding to a specific vertical business sector or to comply with a particular regulatory corpus pertaining to any specific industry or legislation.

Figure 4:
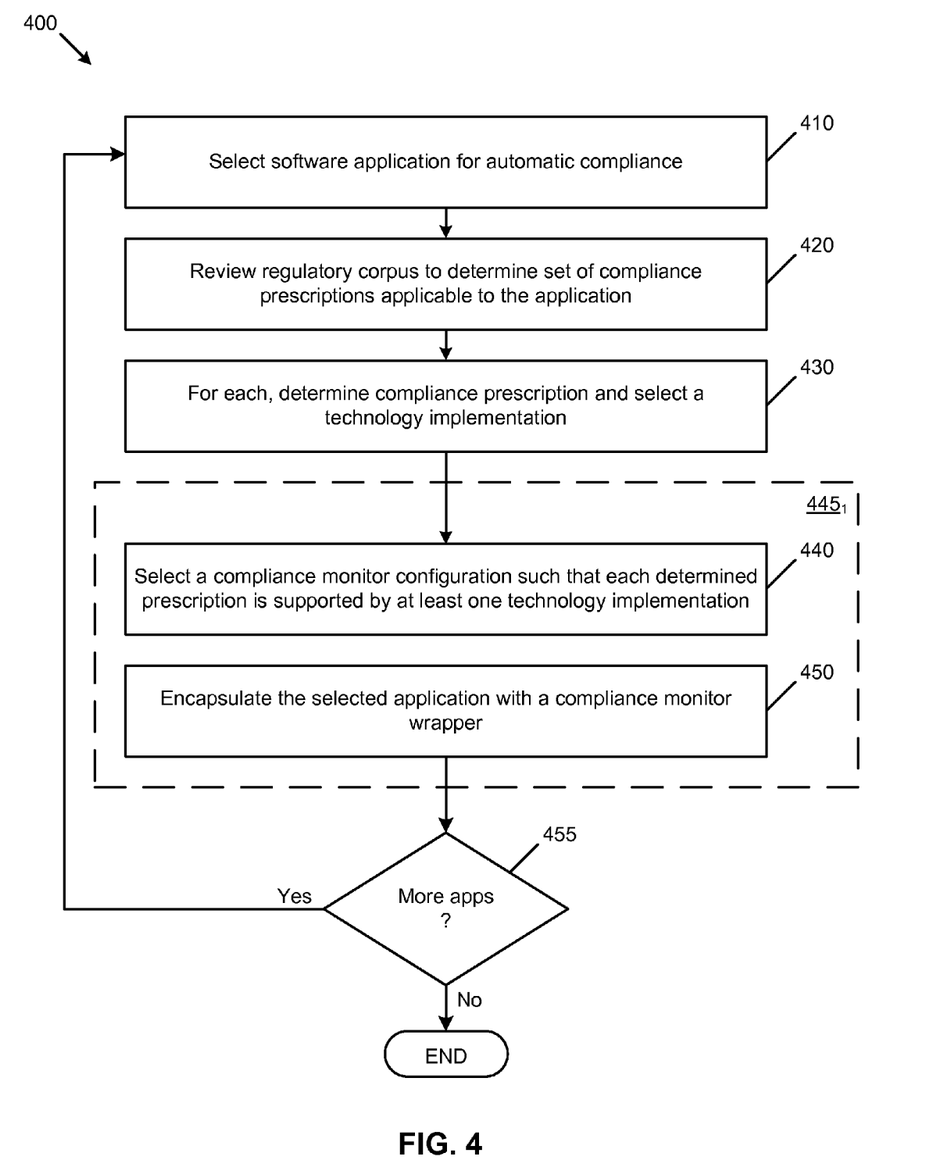
FIG. 4 is a flow chart of a procedure to determine a compliance monitor configuration for automatic deployment of software applications to meet regulatory compliance requirements, according to some embodiments.

More particularly, the configuration of a compliance monitor 134 can be determined by following a procedure, which procedure is shown in FIG. 4, and described as follows.

FIG. 4 is a flow chart 400 of a procedure to determine a compliance monitor configuration for automatic deployment of software applications to meet regulatory compliance requirements. As an option, the present flow chart 400 may be implemented in the context of the architecture and functionality of the embodiments described herein. Also, the flow chart 400 or any aspect therein may be implemented in any desired environment.

The flow commences upon initial identification of an application for automatic compliance (see step 410), and proceeds to a step for reviewing a regulatory corpus to determine a set of compliance prescriptions (see step 420). Given the prescriptions then, one or more particular technology implementations can be selected (see step 430). Further, given the one or more selected technology implementations, an appropriate configuration can be identified. That is, an appropriate compliance platform (including a compliance monitor) might be embodied in a configuration where at least each one of the selected technology implementations is supported by the configuration (see step 440). Once an appropriate configuration has been identified, a corresponding cloud infrastructure can be provisioned in order to support a compliance platform, and into which platform the identified application can be wrapped (see step 450).

Of course, it can occur that services or activities that are to be scrutinized for regulatory compliance may be implemented in more than one application (see hosting platform 118 of FIG. 1B), and as such, the foregoing steps (step 410 through step 450) can be repeated with another identified application, and the cycle can be repeated until there are no more applications to consider (see decision 455).

As can be understood by one skilled in the art, many of the steps of flow chart 400 can be performed by a computer. In particular, step 440 and step 450 can be performed in an iterate block $445_1$.

Figure 5:
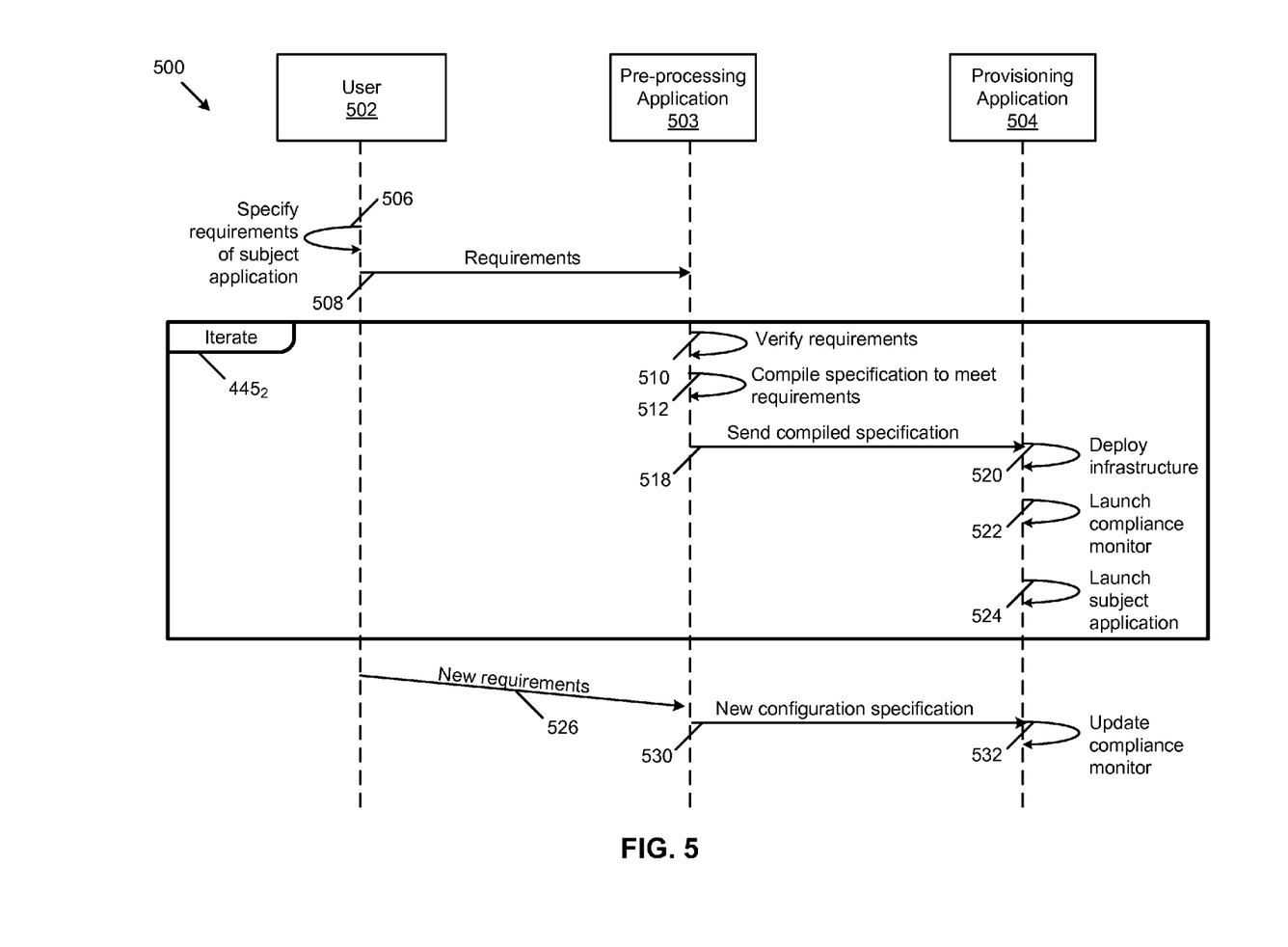
FIG. 5 is a protocol for deploying and maintaining a compliance monitor in an environment for automatic deployment of software applications to meet regulatory compliance requirements, according to some embodiments.

FIG. 5 is a protocol 500 for deploying and maintaining a compliance monitor in an environment for automatic deployment of software applications to meet regulatory compliance requirements. As an option, the present protocol 500 may be implemented in the context of the architecture and functionality of the embodiments described herein. Also, the protocol 500 or any aspect therein may be implemented in any desired environment.

As shown, the protocol commences when a user 502 specifies regulatory requirements pertaining the subject application (see operation 506). In some cases the user's specification or a regulatory corpus can be merely by indication of the name or identifier (e.g., regulatory corpus indication 208) of a particular regulatory corpus (e.g., HIPPA), or by indication of a group name referring to a particular corpora, for example, as applies to given types of activities (e.g., operating a pharmacy may require compliance with both HIPPA as well as PCI, as well as other regulations). Such a specification may be embodied as a user action (e.g., selecting an option in a user interface) or as a message (see message 508), which message may be triggered by an action by the user 502 while interacting with a pre-processing application 503.

Having received a request from the user for a certain range of compliance, the pre-processing application 503 can verify that the requirements are self-consistent, and that the requirements in aggregate can be met (see operation 510). For example, and referring back to configuration data structure 200, if a user were to indicate or imply that secure non-volatile storage would be required to be available in a compliance platform 132, or if such a requirement is inferred from a user indication, then the pre-processing application might specify sufficient secure non-volatile storage and might specify other infrastructure necessary for a suitable compliance platform.

Individual prescriptions indicated by the user can be compiled into a specification of a compliance platform sufficiently configured to implement the prescriptions (see operation 512). In turn, the aggregate specifications can be formatted into a compiled configuration specification and sent to a provisioning application (see compiled specification of message 518). In some cases, and as earlier described in the discussion of configuration data structure 200, a configuration might be codified as merely a configuration name (e.g., Configuration A, Configuration B, etc.).

Upon receipt of the compliance platform specification, the provisioning application 504 maps the given configuration to available cloud infrastructure resources. In some cases cloud infrastructure resources are provisioned as dedicated resources (e.g., a portion of secure non-volatile storage, a LAN port), or in some cases cloud infrastructure resources are provisioned as shared resources (e.g., a network switch) or serially-reusable resources (e.g., a magnetic tape drive). Thus, the provisioning application 504 serves to deploy the cloud infrastructure needed for the compliance platform (see operation 520). The provisioning application further serves to launch the compliance monitor (see operation 522), which compliance monitor may wholly or partially encapsulate an instance of the application server 106, together with any instances of applications (e.g., application $104_1$, application $104_2$, application $104_N$, etc.) to be run within the application server (see operation 524).

Once the compliance platform has been provisioned, and the compliance monitor (that encapsulates the user's application server and applications) is running, the compliance monitor 134 can direct compliance platform resources so as to generate monitor logs pertaining to the regulatory compliance. Such a compliance monitor can further serve to identify and report events and or identify and report observed discrepancies.

As earlier suggested activities subject to regulatory compliance may be implemented in more than one application (see hosting platform 118 of FIG. 1B), and as such, the foregoing provisioning operation (see operations 510 through operation 524) can be repeated for each identified application, and the cycle can be iterated until there are no more applications to consider (see iterate block $445_2$).

Over time, it is possible that existing regulations change, or that new regulations become applicable. In such as case a user (or agent) may recognize the applicability and may indicate the changed or new requirements (see message 526). The changed or new requirements may impact the rows of configuration data structure 200, and/or may impact the columns of configuration data structure 200. For example, a new regulation may admit a new configuration (e.g., Configuration D, not shown), and any such changes precipitated by the new configuration specification (see message 530) can be mapped to updates to the compliance platform and/or can be mapped to updates to the compliance monitor (see operation 532). In some cases updates to the compliance platform and/or updates to the compliance monitor can be performed seamlessly, without user intervention, and in some cases without any downtime.

At least some of the foregoing virtual compliance platforms can be further configured to host a compliance monitor, which in turn can host software applications including "off-the-shelf" software applications. In some cases, a cloud infrastructure vendor may offer popular "off-the-shelf" applications that are pre-provisioned and certified for deployment as off-the-shelf compliant applications; that is, compliant with the applicable regulations.

Examples include:
FinTrak application by acmefin.com based on North America-US-Retail Bank-Architecture (SOX+PCI+DIS) .SOX, PCI and DIS are standards by the U.S. Federal Government.
MyHealth by newbeehealth.com based on architecture code HXC that supports HIPPA
SellStock by f12barstocks.com based on AJSOX that meets J-SOX (Japanese SOX standard)
VeteransHealth by AcmeHealthcare based on HCDOD that meets DoD 5015 standards.

In addition to hosting "off-the-shelf" software applications, some of the herein-disclosed embodiments can be configured to for automatic or semi-automatic deployment and maintenance of custom software applications.

Figure 6:
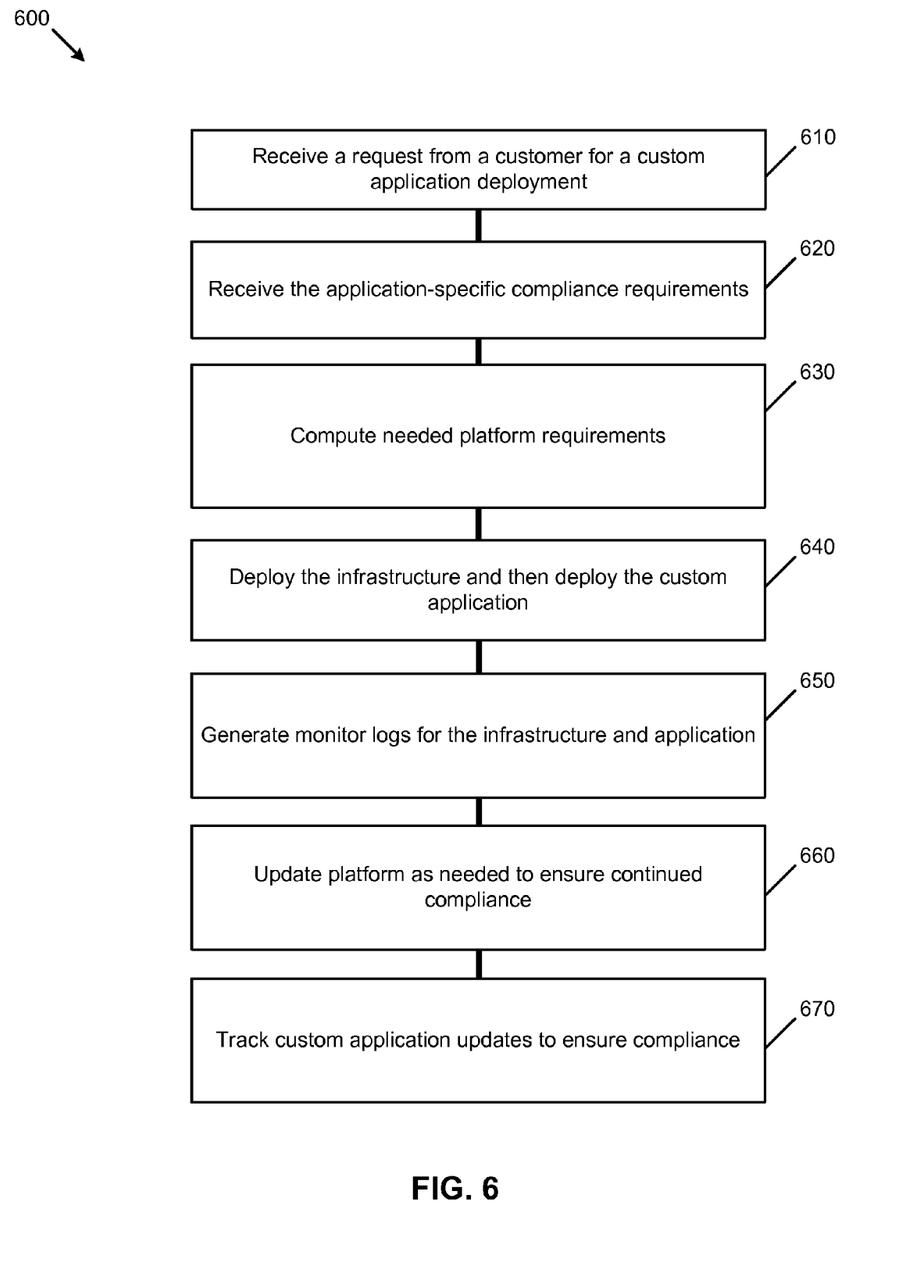
FIG. 6 exemplifies a process for deploying and maintaining a custom software application in an environment for automatic deployment of software applications to meet regulatory compliance requirements, according to some embodiments.

FIG. 6 exemplifies a process 600 for deploying and maintaining a custom software application in an environment for automatic deployment of software applications to meet regulatory compliance requirements, according to some embodiments. As an option, the present process 600 may be implemented in the context of the architecture and functionality of the embodiments described herein. Also, any aspect therein may be implemented in any desired environment.

As shown, the process commences with receiving a request for a custom application deployment and carries through to ingoing tracking of application updates to ensure compliance. The operations involved in process 600 can be performed in any order unless as may be required by the claims. In an exemplary situation, the process 600 can proceed sequentially through the following operations:

- Receive a request for a custom application deployment (see operation 610).
- Receive the application-specific compliance requirements (see operation 620).
- Compute needed platform requirements (see operation 630).
- Deploy the infrastructure and then deploy the customer application (see operation 640).
- Generate monitor logs for the infrastructure and application and report discrepancies (see operation 650).
- Update platform infrastructure as needed to ensure continued compliance (see operation 660).
- Track custom application updates and track performance of the custom application after applying the updates to ensure compliance (see operation 670).

Additional Embodiments of the Disclosure

Figure 7:
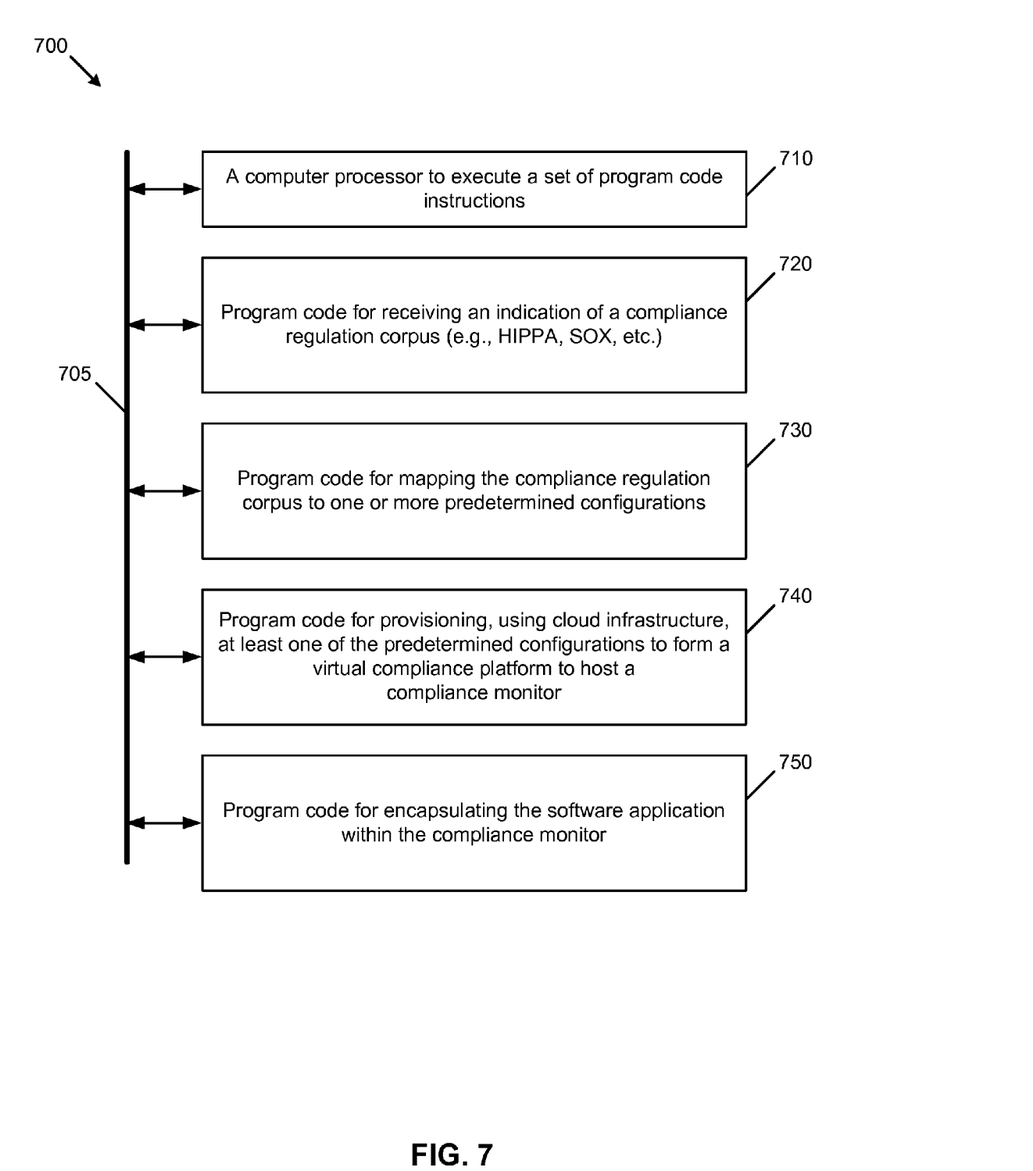
FIG. 7 depicts a block diagram of a system to perform certain functions of a computer system.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving an indication of a compliance corpus (see module 720); mapping the compliance corpus to one or more predetermined configurations (see module 730); provisioning, using cloud infrastructure, at least one of the predetermined configurations to form a virtual compliance platform to host a compliance monitor (see module 740); and encapsulating the software application within the compliance monitor (see module 750).

System Architecture Overview

Figure 8:
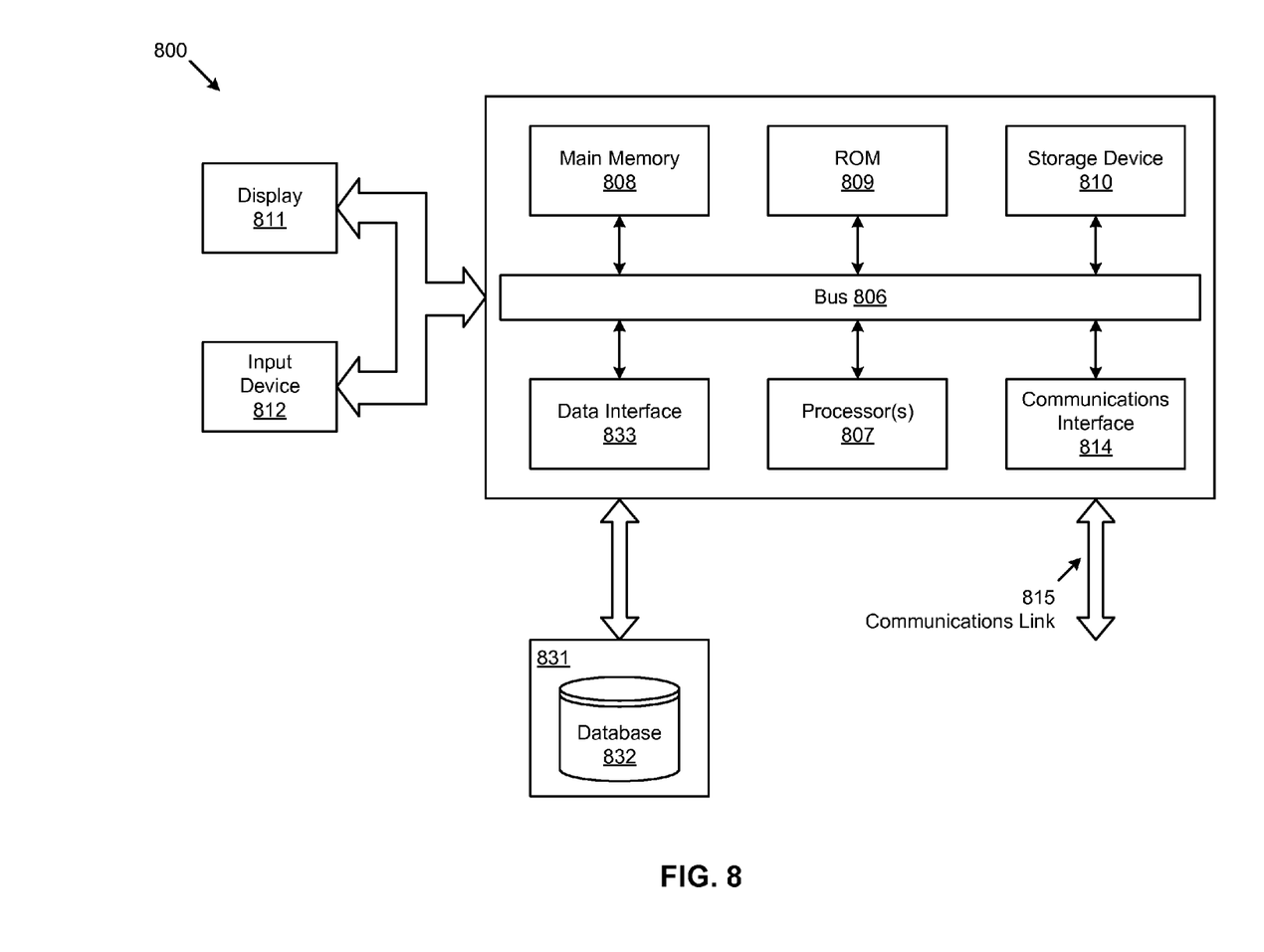
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for automatic deployment of software applications to meet regulatory compliance requirements, the method comprising:
    providing, via a cloud service provider, a virtual compliance platform, wherein the compliance platform is configurable to provide compliance as a service to a customer;
    receiving a software application, the software application developed by the customer;
    receiving an indication of a compliance corpus, wherein the compliance corpus corresponds to a set of compliance regulations, the set of compliance regulations maintained using cloud infrastructure by the cloud service provider;
    mapping the compliance corpus to one or more predetermined configurations, the one or more predetermined configurations specifying a set of cloud infrastructure components corresponding to the received indication of the compliance corpus;
    configuring the virtual compliance platform based at least in part on the at least one of the predetermined configurations, wherein the configured virtual compliance platform hosts a compliance monitor; and
    encapsulating the software application within the compliance monitor.

2. The method of claim 1, wherein the compliance corpus comprises compliance regulations for at least one of HIPPA, SOX, or PCI.

3. The method of claim 1, further comprising receiving a second compliance corpus.

4. The method of claim 1, wherein mapping the compliance corpus to one or more predetermined configurations comprises using a configuration data structure.

5. The method of claim 1, wherein the provisioning is performed in response to a compiled specification.

6. The method of claim 1, wherein the provisioning is performed in response to one or more configuration templates.

7. The method of claim 1, wherein the virtual compliance platform is a virtual machine.

8. The method of claim 1, further comprising uploading an instance of the software application to run within the compliance monitor.

9. A computer system for automatic deployment of software applications to meet regulatory compliance requirements, comprising:
    a computer processor to execute a set of program code instructions; and
    a memory to hold the program code instructions, in which the program code instructions comprises program code to perform,
        providing, via a cloud service provider, a virtual compliance platform, wherein the compliance platform is configurable to provide compliance as a service to a customer;
        receiving a software application, the software application developed by the customer;
        receiving an indication of a compliance corpus, wherein the compliance corpus corresponds to a set of compliance regulations, the set of compliance regulations maintained using cloud infrastructure by the cloud service provider;
        mapping the compliance corpus to one or more predetermined configurations, the one or more predetermined configurations specifying a set of cloud infrastructure components corresponding to the received indication of the compliance corpus;
        configuring the virtual compliance platform based at least in part on the at least one of the predetermined configurations, wherein the configured virtual compliance platform hosts a compliance monitor; and
        encapsulating the software application within the compliance monitor.

10. The computer system of claim 9, wherein the compliance corpus comprises compliance regulations for at least one of, HIPPA, SOX, or PCI.

11. The computer system of claim 9, further comprising receiving a second compliance corpus.

12. The computer system of claim 9, wherein mapping the compliance corpus to one or more predetermined configurations comprises using a configuration data structure.

13. The computer system of claim 9, wherein the provisioning is performed in response to a compiled specification.

14. The computer system of claim 9, wherein the provisioning is performed in response to one or more configuration templates.

15. The computer system of claim 9, wherein the virtual compliance platform is a virtual machine.

16. A computer program product embodied in a non-transitory computer readable medium, the computer readable medium having stored thereon a sequence of instructions which, when executed by a processor causes the processor to execute a process to implement automatic deployment of software applications to meet regulatory compliance requirements, the process comprising:
    providing, via a cloud service provider, a virtual compliance platform, wherein the compliance platform is configurable to provide compliance as a service to a customer;
    receiving a software application, the software application developed by the customer;
    receiving an indication of a compliance corpus, wherein the compliance corpus corresponds to a set of compliance regulations, the set of compliance regulations maintained using cloud infrastructure by the cloud service provider;
    mapping the compliance corpus to one or more predetermined configurations, the one or more predetermined configurations specifying a set of cloud infrastructure components corresponding to the received indication of the compliance corpus;
    configuring the virtual compliance platform based at least in part on the at least one of the predetermined configurations, wherein the configured virtual compliance platform hosts a compliance monitor; and
    encapsulating the software application within the compliance monitor.

17. The computer program product of claim 16, wherein the compliance corpus comprises compliance regulations for at least one of, HIPPA, SOX, or PCI.

18. The computer program product of claim 16, wherein mapping the compliance corpus to one or more predetermined configurations comprises using a configuration data structure.

19. The computer program product of claim 16, wherein the provisioning is performed in response to a compiled specification.

20. The computer program product of claim 16, wherein the provisioning is performed in response to one or more configuration templates.

21. The method of claim 1, wherein the software application is at least one of an instance of the software application and an application environment.

* * * * *